Jan. 11, 1955

M. G. BALES 2,699,345

RETAINER

Filed May 25, 1950

INVENTOR
MAX G. BALES
BY
Willits, Hardman & Fehr
His ATTORNEYS

United States Patent Office 2,699,345
Patented Jan. 11, 1955

2,699,345

RETAINER

Max G. Bales, Anderson, Ind., assignor to General Motors Corporation, Detroit, Mich., a corporation of Delaware Application May 25, 1950, Serial No. 164,259

1 Claim. (Cl. 286—5)

This invention relates to improvements in the art of shaft sealing and more particularly to shaft sealing to prevent the entrance around the shaft of dirt into a housing from which the shaft extends.

Heretofore a ring of fibrous material, such as felt was located in a recess of the housing wall through which the shaft extends. The ring of felt engages the shaft to seal the gap between the shaft and the housing wall. The accumulation of dirt in the joint between the shaft and ring increases friction between these parts so that the ring is finally rotated by the shaft and is caused to wear due to abrasion by the wall of the recess which receives the felt ring.

An object of the present invention is to provide an inexpensive means for retaining a felt ring in the recess and to prevent rotation of the ring by the shaft. This object is accomplished by a one-piece retainer ring for holding a felt washer within a recess of a support and preventing the washer from rotating within the recess. The retainer includes a ring punched from sheet metal having a plurality of spaced tangs extending from its outer periphery and bent upwardly at an obtuse angle from the normal plane of the ring and a plurality of inner spaced tines bent downwardly at right angles to the normal plane of the ring whereby when the ring is forced longitudinally into the recess the tines will pierce the felt washer and the tangs will bite into the cylindrical walls of the recess of the support.

Further objects and advantages of the present invention will be apparent from the following description, reference being had to the accompanying drawings wherein a preferred embodiment of the present invention is clearly shown.

Figure 1:
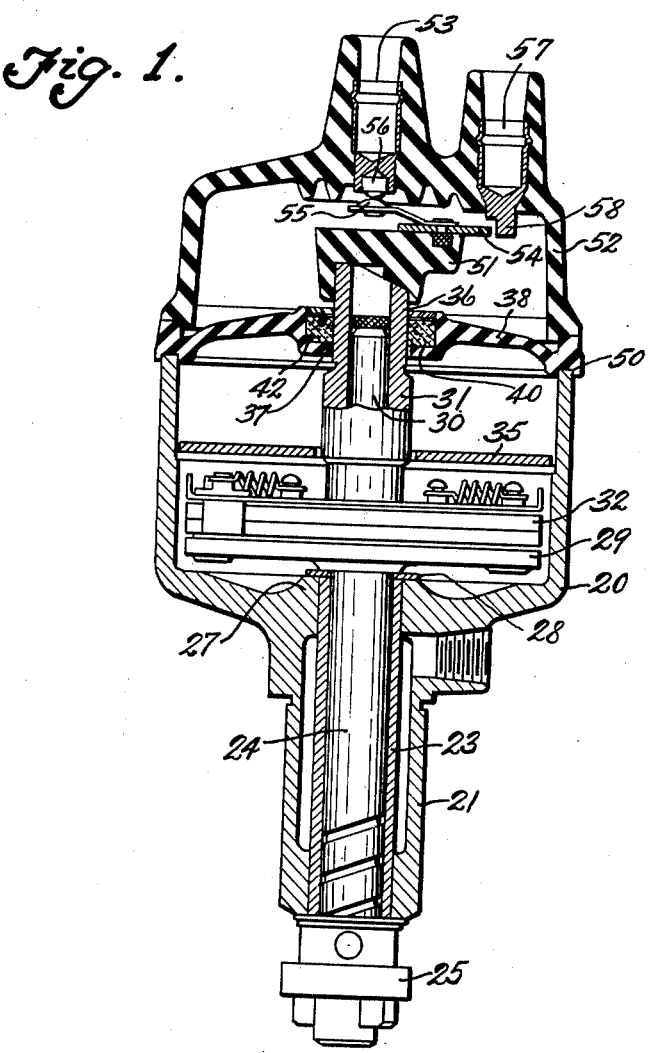
Fig. 1 is a sectional view through an ignition distributor with the circuit breaker mechanism removed.

Referring to the drawings, 20 designates a cup-shaped housing for an ignition apparatus, and having a shank 21 which is adapted to fit in an opening of a crankcase to support the ignition apparatus upon the engine. The shank is hollow and supports a sleeve bearing 23 for a drive shaft 24. One end of the shaft supports a member 25 which is operatively connected with a rotatable part, preferably on the cam shaft of an engine, not shown. A boss 27 provided by the housing supports a bearing washer 28 upon which rests a plate 29 secured to the drive shaft 24.

The portion of the shaft 24 extending above the plate 29 is of reduced diameter as shown at 30. The reduced portion 30 of the shaft 24 rotatably supports a cam 31. The drive shaft 24 is connected from the plate with the cam 31 by centrifugal means 32 which will vary the angular relation between the cam 31 and the shaft 24 in response to variations in speed of the shaft. Since the construction and operation of the centrifugal device forms no part of the present invention and is well known, further description is deemed unnecessary.

A plate 35, which supports the circuit interrupter of the ignition apparatus, not shown, is secured within the housing 20 in any suitable manner. The plate 35 is provided with a central opening through which the cam 31 extends.

Figure 2:
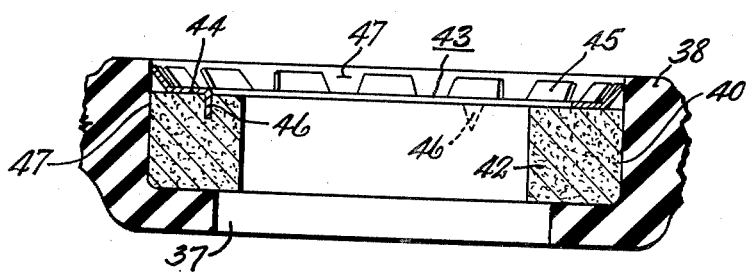
Fig. 2 is a sectional view, on an enlarged scale, of the retainer ring shown in Fig. 1 and showing the manner in which the same may be used to hold a felt washer within a recess of a support.

The upper end of the cam 31 is reduced at 36 and extends through a counterbored central opening 37 of a cover 38 of molded insulating material. The opening in this instance has two different diameters, the larger sections being on the top of the cover as viewed from the drawings. An annular shoulder 40 is provided at the junction of the two sections. A felt sealing washer 42 rests on the shoulder and is held against the shoulder 40 and also from rotating by a retainer member 43. In the present instance the retainer member 43 is preferably a one-piece ring. The retainer is punched from sheet metal. As best shown in Fig. 2, the retainer includes a main flat portion 44 which is notched or cut away to provide a plurality of integral, spaced, radial tangs 45 extending from the outer periphery of the main portion 44. These tangs are bent upwardly, as viewed in Fig. 2, at an obtuse angle so as to make the tangs resilient. The retainer member 43 is also formed with a plurality of integral inner tines or pointed spikes 46 which are preferably bent downwardly at right angles to the normal plane of the main flat portion 44. It is to be understood that the tines could be bent at any angle that will insure proper stiffness for the tines to pierce the felt washer. The purpose of the retainer ring is to hold the felt washer 42 against the shoulder 40 and to prevent the felt washer from rotating with the cam extension 36 at any time. The diameter of the larger section of opening 37 is less than the cross dimension of the retainer member 43 in its deformed state. Thus, the retainer must be forced into the larger section. This forcing operation causes the tines 46 to pierce the felt washer 42. This operation also causes the felt washer to expand radially in several directions to make sealing engagement with the annular wall 47 and with the reduced portion 36 of the cam 31. After the retainer member is pushed into the opening to the final position and the force released, the resilient tangs 45 will bite into the cylindrical wall 47 of the larger section of the opening to hold the felt washer in place, as clearly shown in Fig. 2. Thus all that is required to hold the felt washer in the opening 37 and to provide a sealing engagement between the cam shaft extension 36 and the washer and a sealing engagement between the washer and the marginal wall of the larger section of the opening is to insert the retainer member and simply push the retainer ring down in the larger section whereupon the tines 46 will pierce the felt washer 42 and the tang 45 will bite into the cylindrical walls of the larger section of the opening of the cover.

The under side of the cover 38 is provided with an annular groove 50 to receive upper rim of the housing 20 to support cover 38. The upper end of the cam extension 36 supports a rotor 51. A distributor head 52 is supported on the cover 38 and the head and cover is held on the housing in any suitable manner preferably by clips, not shown, which are carried by the housing 20 and are adapted to engage lugs, not shown, on the head 52. The distributor head has a central high tension terminal 53 which is in electrical contact with a conductor strip 54 supported on the rotor through a spring supporting button 55 attached to a strip 54 and the brush 56 attached to terminal 53. A plurality of terminals 57 are supported by the head and are arranged in a circular row, each terminal having a post 58 extending downwardly into the head. When rotated, the rotor moves the conductor strip 54 in close proximity to each of the parts 58 whereby sparking impulses are directed through the terminal 53, through brush 56, button conductor strip 55 to the various posts 58 in recurrent sequence.

While the embodiment of the present invention as herein disclosed, constitutes a preferred form, it is to be understood that other forms might be adopted.

What is claimed is as follows:

A packing for a rotatable shaft including a stationary member that has an opening through which the shaft extends, said stationary member having an inner cylindrical wall and a radial wall extending radially inward from said inner cylindrical wall, said walls defining a recess which acts as an internal seat; a yieldable ring-shaped packing member disposed in said recess and contacting said inner cylindrical wall and said radial wall for sealingly engaging both the shaft and the walls of the recess and a closed spring metal clamping ring for said packing member insertable in said recess, said metal ring having a plain annular surface in contacting engagement with the packing member and having oppositely extending tangs around its inner and outer peripheries, the tangs at the outer periphery being disposed at an obtuse angle with respect to the plain annular surface of the ring and the tangs at the inner periphery being disposed at substantially right angles to the plain annular surface of the ring, said outer periphery tangs being adapted to bite into the cylindrical wall of the recess and said inner periphery tangs being adapted to embed themselves in the packing member when said clamping ring is pressed into the recess upon said packing member for forcing the packing member against the radial wall and simultaneously preventing said packing member from rotating with the shaft.

References Cited in the file of this patent

UNITED STATES PATENTS

| | | |
|---|---|---|
| 1,935,610 | Beeh | Nov. 21, 1933 |
| 2,211,899 | Kriegbaum | Aug. 20, 1940 |
| 2,291,570 | Clark | July 28, 1942 |
| 2,413,743 | Carlson | Jan. 7, 1947 |
| 2,464,022 | Carpenter | Mar. 8, 1949 |

FOREIGN PATENTS

| | | |
|---|---|---|
| 421,035 | Germany | Nov. 5, 1925 |
| 430,173 | Great Britain | June 14, 1935 |